United States Patent
Huang et al.

(10) Patent No.: US 11,516,819 B2
(45) Date of Patent: Nov. 29, 2022

(54) UPLINK CHANNEL COLLISION RESOLUTION FOR CONDITIONAL MEDIA ACCESS CONTROL (MAC) LAYER BASED PRIORITIZATION

(71) Applicant: QUALCOMM Incorporated, San Diego, CA (US)

(72) Inventors: Yi Huang, San Diego, CA (US); Peter Gaal, San Diego, CA (US); Wei Yang, San Diego, CA (US); Vinay Joseph, Ker (IN); Seyedkianoush Hosseini, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 15/931,497

(22) Filed: May 13, 2020

(65) Prior Publication Data

US 2020/0367261 A1 Nov. 19, 2020

Related U.S. Application Data

(60) Provisional application No. 62/848,525, filed on May 15, 2019.

(51) Int. Cl.
*H04W 72/10* (2009.01)
*H04W 74/08* (2009.01)
*H04W 72/04* (2009.01)

(52) U.S. Cl.
CPC ....... *H04W 72/10* (2013.01); *H04W 72/0413* (2013.01); *H04W 74/0816* (2013.01)

(58) Field of Classification Search
None
See application file for complete search history.

(56) References Cited

U.S. PATENT DOCUMENTS

| 2017/0013565 A1* | 1/2017 | Pelletier | H04W 52/365 |
| 2018/0331743 A1 | 11/2018 | Shen | |
| 2019/0045546 A1 | 2/2019 | Li | |

(Continued)

OTHER PUBLICATIONS

R1-1902182 Sony "Considerations on UL Intra-UE Tx Multiplexing" 3GPP WG1 #96 Athens Mar. 2019 (Year: 2019).*

(Continued)

*Primary Examiner* — Basil Ma
(74) *Attorney, Agent, or Firm* — Harrity & Harrity LLP/Qualcomm Incorporated (57) ABSTRACT

Various aspects of the present disclosure generally relate to wireless communication. In some aspects, a user equipment may detect a collision between a physical uplink control channel and a plurality of physical uplink shared channels (PUSCHs) with a corresponding plurality of media access control (MAC) priorities, selectively applying a MAC prioritization rule for processing the plurality of PUSCHs based at least in part on the corresponding plurality of MAC priorities and based at least in part on an effect of the plurality of MAC priorities on an uplink control information (UCI) multiplexing configuration for UCI multiplexing, and selectively transmitting at least one of the plurality of PUSCHs with the UCI based at least in part on a result of selectively applying the MAC prioritization rule. Numerous other aspects are provided.

30 Claims, 6 Drawing Sheets

(56) References Cited

U.S. PATENT DOCUMENTS

| | | |
|---|---|---|
| 2019/0253207 A1 | 8/2019 | Li |
| 2020/0314900 A1 | 10/2020 | Hosseini et al. |
| 2020/0344805 A1 | 10/2020 | Hosseini et al. |

OTHER PUBLICATIONS

R1-1900337 CATT "Discussion on intra-UE multiplexing scenarios" 3GPP WG1 AH 1901 Taipei Jan. 2019 (Year: 2019).*
R2-1907924 Qualcomm "Intra-UE prioritization framework" 3GPP WG2 #106 Reno May 2019 (Year: 2019).*
Huawei, et al., "Intra-UE Transmission Prioritization and Multiplexing", 3GPP Draft, 3GPP TSG RAN WGl Meeting #96, R1-1903081, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051600777, 9 pages, Retrieved from the Internet: URL: http://www.3gpp.org/ftp/tsg%5Fran/WG1%5FRL1/TSGR1%5F96/Docs/R1%2D1903081%2Ezip. [retrieved on Feb. 16, 2019] the whole document.
OPPO: "Discussions on Intra-UE Multiplexing Scenarios", 3GPP Draft, 3GPP TSG RAN WG1 #96, R1-1902422, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600118, 6 pages, Retrieved from the Internet: URL: http://www.3gpp.org/ftp/tsg%5Fran/WG1%5FRL1/TSGR1%5F96/Docs/R1%2D1902422%2Ezip. [retrieved on Feb. 15, 2019] the whole document.
Partial International Search Report—PCT/US2020/020674—ISA/EPO—dated Jun. 17, 2020.
VIVO: "UL Intra UE TX Prioritization for URLLC", 3GPP Draft, 3GPP TSG RAN WG1 #96, R1-1901698, UL Intra UE TX Prioritization for URLLC, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599394, 5 pages, Retrieved from the Internet: URL: http://www.3gpp.org/ftp/tsg%5Fran/WG1%5FRL1/TSGR1%5F96/Docs/R1%2D1901698%2Ezip. [retrieved on Feb. 16, 2019] the whole document.
Intel Corporation: "On UCI Enhancements for eURLLC", R1-1900494, 3GPP TSG RAN WG1 Ad-Hoc Meeting 1901, Taipei, Taiwan, Jan. 21-25, 2019, pp. 1-6.
*Citation part 1 of 2*—SONY: "Considerations on UL Intra-UE Tx Multiplexing", 3GPP TSG RAN WG1 #96, 3GPP Draft; R1-1902182—REL-16 URLLC—INTRA-UE MUX V00, 3rd Generation Partnership Project (3GPP), Mobile Competence Centre; 650, Route Des Lucioles; F-06921, Sophia-Antipolis Cedex; France, vol. RAN WG1, No. Athens, Greece; Feb. 25, 2019.
*Citation part 2 of 2*—Mar. 1, 2019, Feb. 16, 2019 (Feb. 16, 2019), XP051599877, 9 Pages, Retrieved from the Internet: URL: http://www.3gpp.org/ftp/tsg%5Fran/WG1%5FRL1/TSGR1%5F96/Docs/R1%2D1902182%2Ezip [retrieved on Feb. 16, 2019] Proposal 16; p. 7-p. 7.
CATT: "Discussion on Intra-UE Multiplexing Scenarios", 3GPP Draft, 3GPP TSG RAN WG1 Ad-Hoc Meeting 1901, R1-1900337, Discussion on Intra-UE Multiplexing Scenarios, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593251, 9 pages, Retrieved from the Internet: URL: http://www.3gpp.org/ftp/Meetings%5F3GPP%5FSYNC/RAN1/Docs/R1%2D1900337%2Ezip and URL:http://3gpp.org/ftp/tsg_ran/WG1_RL1/TSGR1_AH/NR_AH-1901/Docs.
Frotzscher A., et al., "Requirements and Current Solutions of Wireless Communication in Industrial Automation", ICC'14—W8: Workshop on 5G Technologies, IEEE, 2014, pp. 67-72.
International Search Report and Written Opinion—PCT/US2020/032906—ISA/EPO—dated Aug. 13, 2020.
NTT Docomo Inc: "UL Intra-UE Transmission Prioritization/Multiplexing", 3GPP Draft, R1-1902810, 3GPP TSG RAN WG1 #96, URLLC UL Intra-UE, 3rd Generation Partnership Project (3GPP), Mobile Competence Centre, 650, Route Des Lucioles, F-06921 Sophia-Antipolis Cedex, France vol. RAN WG1, No. Athens, Greece; Feb. 25, 2019-Mar. 1, 2019, Feb. 16, 2019 (Feb. 16, 2019), XP051600505, 6 Pages, Retrieved from the Internet: URL:http://www.3gpp.org/ftp/tsg%5Fran/WG1%5FRL1/TSGR1%5F96/Docs/R1%2D1902810%2Ezip [retrieved on Feb. 16, 2019] The Whole Document.
QUALCOMM Incorporated: "Views on Intra-UE Prioritization", 3GPP Draft, R2-1908126, Views on Intra-UE Prioritization, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 12, 2019 (May 12, 2019), XP051740317, 4 pages, Retrieved from the Internet: URL: http://www.3gpp.org/ftp/tsg%5Fran/WG2%5FRL2/TSGR2%5F106/Docs/R2%2D1908126%2Ezip. [retrieved on May 12, 2019] section 2—section 4.
QUALCOMM Incorporated: "Intra-UE Prioritization Framework", 3GPP Draft, R2-1907924, Intra-UE Prioritization Framework, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051731337, pp. 1-12, Retrieved from the Internet: URL: http://www.3gpp.org/ftp/Meetings%5F3GPP%5FSYNC/RAN2/Docs/R2%2D1907924%2Ezip. [retrieved on May 13, 2019] p. 1-p. 3.
CATT: "Discussion on Intra-UE Multiplexing Scenarios", 3GPP Draft, 3GPP TSG RAN WG1 Ad-Hoc Meeting 1901, R1-1900337, Discussion on Intra-UE Multiplexing Scenarios, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593251, 9 pages, Retrieved from the Internet: URL: http://www.3gpp.org/ftp/Meetings%5F3GPP%5FSYNC/RAN1/Docs/R1%2D1900337%2Ezip and URL:http://www.3gpp.org/ftp/Meetings%5F3GPP%5FSYNC/RAN1/Docs/R1%2D1900337%2Ezip[retrieved on Jan. 20, 2019] figures 1-4 sections 2-3.
Interdigital Inc: "URLLC UCI Prioritization", 3GPP Draft, R1-1811114, 3GPP TSG RAN WG1 Meeting #94 bis (R16 NR WI AI 7265 UCI for URLLC), 3rd Generation Partnership Project (3GPP), Mobile Competence Centre, 650, Route Des Lucioles, F-06921, Sophia-Antipolis Cedex, France vol. RAN WG1, No. Chengdu, China; Oct. 8, 2018-Oct. 12, 2018, Sep. 29, 2018 (Sep. 29, 2018), XP051518517, 2 Pages, Retrieved from the Internet: URL:http://www.3gpp.org/ftp/tsg%5Fran/WG1%5FRL1/TSGR1%5F94b/Docs/R1%2D1811114%2Ezip [retrieved on Sep. 29, 2018] The Whole Document.

* cited by examiner

UPLINK CHANNEL COLLISION RESOLUTION FOR CONDITIONAL MEDIA ACCESS CONTROL (MAC) LAYER BASED PRIORITIZATION

CROSS-REFERENCE TO RELATED APPLICATION

This Patent Application claims priority to U.S. Provisional Patent Application No. 62/848,525, filed on May 15, 2019, entitled "UPLINK CHANNEL COLLISION RESOLUTION FOR CONDITIONAL MEDIA ACCESS CONTROL (MAC) LAYER BASED PRIORITIZATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink channel collision resolution for conditional media access control (MAC) layer based prioritization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include detecting a collision between a physical uplink control channel (PUCCH) and a plurality of physical uplink shared channels (PUSCHs) with a corresponding plurality of media access control (MAC) priorities, wherein the PUCCH is associated with uplink control information (UCI); selectively applying a MAC prioritization rule for processing the plurality of PUSCHs based at least in part on the corresponding plurality of MAC priorities and based at least in part on an effect of the plurality of MAC priorities on a UCI multiplexing configuration for UCI multiplexing; and selectively transmitting at least one of the plurality of PUSCHs with the UCI based at least in part on a result of selectively applying the MAC prioritization rule.

In some aspects, a UE for wireless communication may include memory and one or more processors operatively coupled to the memory. The memory and the one or more processors may be configured to detect a collision between a PUCCH and a plurality of PUSCHs with a corresponding plurality of MAC priorities, wherein the PUCCH is associated with UCI; selectively apply a MAC prioritization rule for processing the plurality of PUSCHs based at least in part on the corresponding plurality of MAC priorities and based at least in part on an effect of the plurality of MAC priorities on a UCI multiplexing configuration for UCI multiplexing; and selectively transmit at least one of the plurality of PUSCHs with the UCI based at least in part on a result of selectively applying the MAC prioritization rule.

In some aspects, a method of wireless communication, performed by a base station (BS), may include determining a UCI multiplexing configuration in connection with a MAC prioritization rule for a scheduled collision between a PUCCH with UCI and a plurality of PUSCHs with a corresponding plurality of MAC priorities; and receiving at least one of the plurality of PUSCHs based at least in part on determining the UCI multiplexing configuration.

In some aspects, a BS for wireless communication may include memory and one or more processors operatively coupled to the memory. The memory and the one or more processors may be configured to determine a UCI multiplexing configuration in connection with a MAC prioritization rule for a scheduled collision between a PUCCH with UCI and a plurality of PUSCHs with a corresponding plurality of MAC priorities; and receive at least one of the plurality of PUSCHs based at least in part on determining the UCI multiplexing configuration.

In some aspects, a non-transitory computer-readable medium may store one or more instructions for wireless communication. The one or more instructions, when executed by one or more processors of a BS, may cause the one or more processors to: detect a collision between a PUCCH and a plurality of PUSCHs with a corresponding plurality of MAC priorities, wherein the PUCCH is associated with UCI; selectively apply a MAC prioritization rule for processing the plurality of PUSCHs based at least in part on the corresponding plurality of MAC priorities and based at least in part on an effect of the plurality of MAC priorities on a UCI multiplexing configuration for UCI multiplexing; and selectively transmit at least one of the plurality of PUSCHs with the UCI based at least in part on a result of selectively applying the MAC prioritization rule.

In some aspects, a non-transitory computer-readable medium may store one or more instructions for wireless communication. The one or more instructions, when executed by one or more processors of a BS, may cause the one or more processors to: determine a UCI multiplexing configuration in connection with a MAC prioritization rule for a scheduled collision between a PUCCH with UCI and a plurality of PUSCHs with a corresponding plurality of MAC priorities; and receive at least one of the plurality of PUSCHs based at least in part on determining the UCI multiplexing configuration.

In some aspects, an apparatus for wireless communication may include means for detecting a collision between a PUCCH and a plurality of PUSCHs with a corresponding plurality of MAC priorities, wherein the PUCCH is associated with UCI; means for selectively applying a MAC prioritization rule for processing the plurality of PUSCHs based at least in part on the corresponding plurality of MAC priorities and based at least in part on an effect of the plurality of MAC priorities on a UCI multiplexing configuration for UCI multiplexing; and means for selectively transmitting at least one of the plurality of PUSCHs with the UCI based at least in part on a result of selectively applying the MAC prioritization rule.

In some aspects, an apparatus for wireless communication may include means for determining an UCI multiplexing configuration in connection with a MAC prioritization rule for a scheduled collision between a PUCCH with UCI and a plurality of PUSCHs with a corresponding plurality of MAC priorities; and means for receiving at least one of the plurality of PUSCHs based at least in part on determining the UCI multiplexing configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
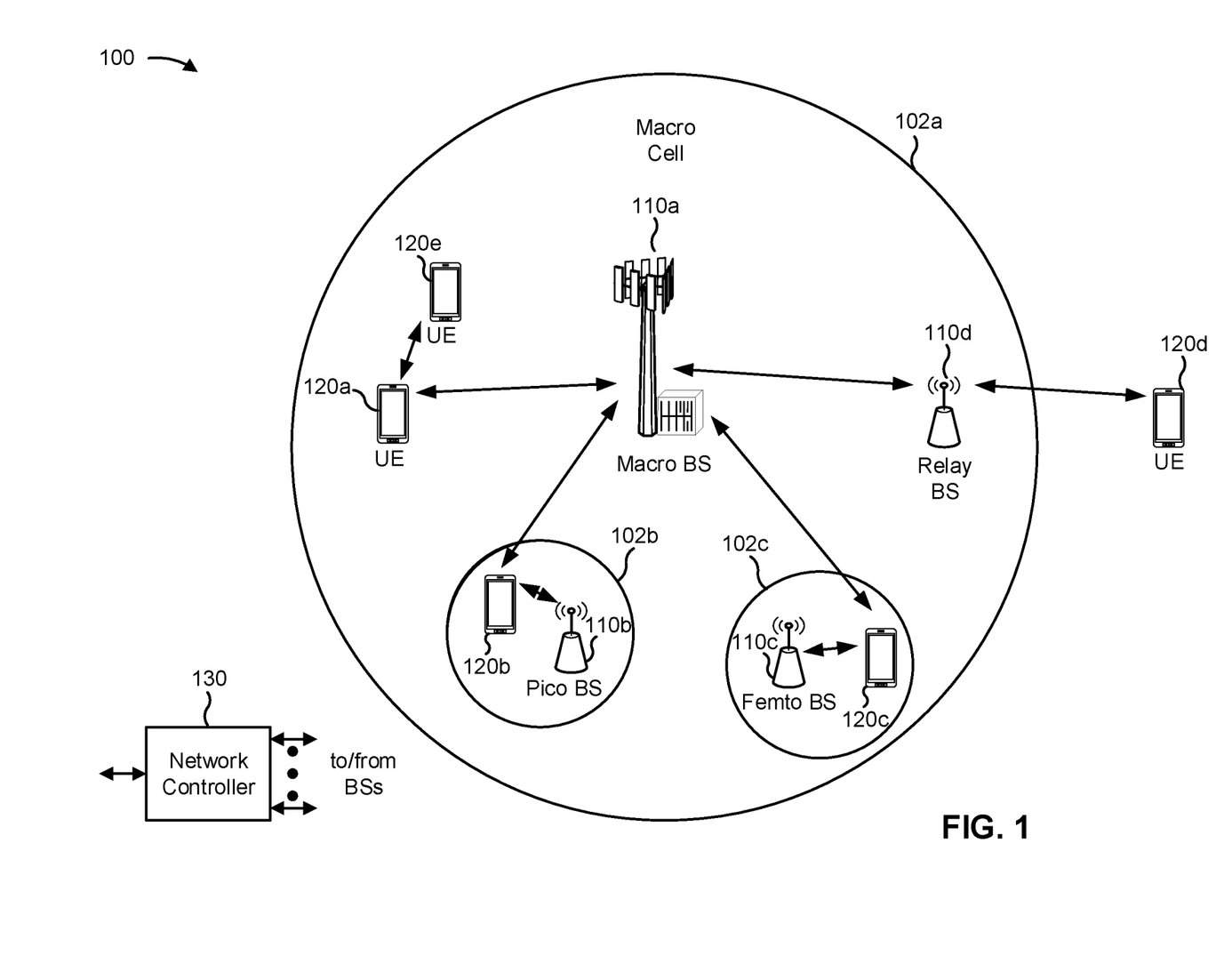
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
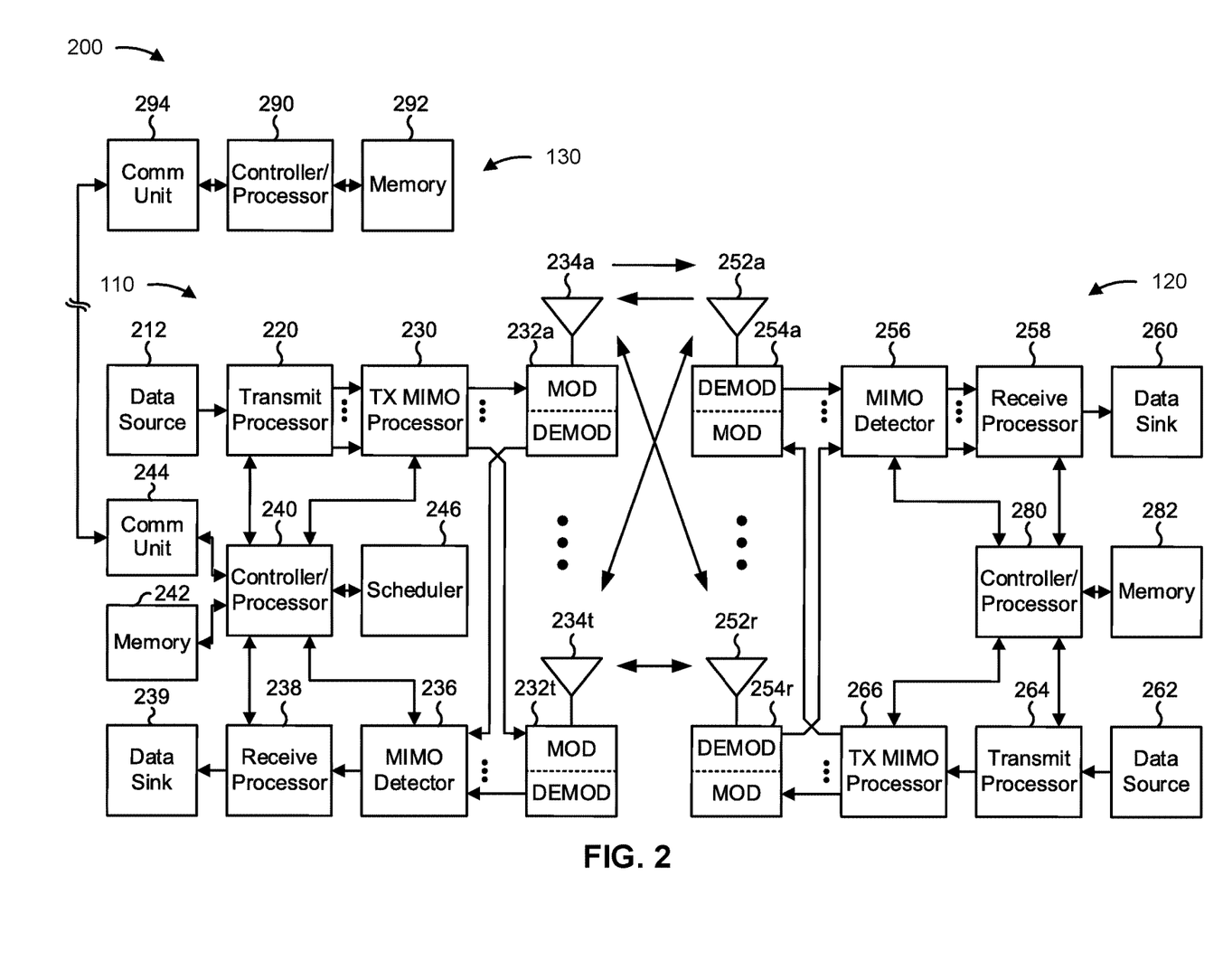
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with uplink channel collision resolution for conditional MAC layer based prioritization, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for detecting (e.g., using controller/processor 280 and/or the like) a collision between a physical uplink control channel (PUCCH) and a plurality of physical uplink shared channels (PUSCHs) with a corresponding plurality of media access control (MAC) priorities, means for selectively applying (e.g., using controller/processor 280 and/or the like) a MAC prioritization rule for processing the plurality of PUSCHs based at least in part on the corresponding plurality of MAC priorities and based at least in part on an effect of the plurality of MAC priorities on an uplink control information (UCI) multiplexing configuration for UCI multiplexing, means for selectively transmitting (e.g., using controller/processor 280, transmit processor 264, TX MIMO processor 266, MOD 254, antenna 252, and/or the like) at least one of the plurality of PUSCHs with the UCI based at least in part on a result of selectively applying the MAC prioritization rule, and/or the like. In some aspects, such means may include one or more components of UE 120 described in connection with FIG. 2.

In some aspects, base station 110 may include means for determining (e.g., using controller/processor 240 and/or the like) a UCI multiplexing configuration in connection with a MAC prioritization rule for a scheduled collision between a PUCCH with UCI and a plurality of PUSCHs with a corresponding plurality of MAC priorities, means for receiving (e.g., using antenna 234, DEMOD 232, MIMO detector 236, receive processor 238, controller/processor 240, and/or the like) at least one of the plurality of PUSCHs based at least in part on determining the UCI multiplexing configuration, and/or the like. In some aspects, such means may include one or more components of base station 110 described in connection with FIG. 2.

As indicated above, FIG. 2 is provided as an example. Other examples may differ from what is described with regard to FIG. 2.

In some communications systems, such as NR, a UE may be scheduled to transmit a plurality of channels concurrently. For example, a BS may schedule the UE for transmission of a PUCCH and one or more PUSCHs using the same orthogonal frequency multiplexing (OFDM) symbol. The UE may be unable to concurrently transmit the PUCCH and a PUSCH in a same PUCCH group or a plurality of PUSCHs using a single component carrier. However, the UE may be able to concurrently transmit a plurality of PUSCHs using a plurality of different component carriers.

Thus, the BS may define prioritizations for the different channels in order to enable the UE to resolve which channels to transmit when the UE is unable to transmit a plurality of channels concurrently. For example, the BS may define an ultra-reliable low latency communication (URLLC) channel as a high priority channel that may preempt other, lower priority channels. The BS may define channel priorities using physical (PHY) layer prioritization. For example, a BS may define a URLLC hybrid automatic repeat request acknowledgement (HARQ-ACK) with a first PHY priority, a URLLC PUSCH with a second PHY priority, an enhanced mobile broadband (eMBB) HARQ-ACK with a third PHY priority, an eMBB PUSCH with a fourth priority, and/or the like. In this case, the BS may explicitly or implicitly indicate a PHY priority of a particular channel using a downlink control information (DCI) of a scheduling grant that schedules the particular channel.

The UE may also define channel priorities using MAC layer prioritization. For example, the UE may determine a priority of a MAC payload that is to be conveyed via an uplink channel and may assign a corresponding MAC priority to the uplink channel based at least in part on the priority of the MAC payload. In some cases, the uplink channel may lack a PHY priority, and only the MAC priority may be assigned to the uplink channel. In other cases, the uplink channel may have a PHY priority and the MAC priority may override or alter the PHY priority.

When the UE is scheduled to transmit a PUCCH and one or more higher priority PUSCHs, the UE may multiplex the UCI of the PUCCH onto a PUSCH. In this case, the UE may drop the PUCCH and transmit the one or more higher priority PUSCHs. In this way, the UE ensures that both the UCI and the data of the one or more higher priority PUSCHs can both be conveyed to a BS. When using PHY layer prioritization, the UE may select a particular PUSCH of the one or more higher priority PUSCHs onto which to multiplex the UCI based at least in part on a set of fixed rules. For example, when a particular PUSCH includes an aperiodic channel state information (A-C SI) message, the UE may select the particular PUSCH onto which to multiplex the UCI. This may improve the probability that the A-CSI and the UCI are transmitted on the same PUSCH. Similarly, when a dynamic PUSCH and a configured PUSCH are available, the UE may select the dynamic PUSCH onto which to multiplex the UCI. Similarly, when selecting a PUSCH of a plurality of PUSCHs associated with a plurality of component carriers onto which to multiplex the UCI, the UE may select a PUSCH associated with a lowest indexed component carrier. Other PHY layer rules may be possible. In this way, the UE may multiplex UCI and the BS may determine onto which, of a plurality of PUSCHs, the UE multiplexed the UCI, thereby enabling the BS to decode the plurality of PUSCHs and the UCI thereof.

However, when MAC layer prioritization is applied, the BS may be unable to determine a relative priority of each PUSCH without having already decoded the payload data of each PUSCH. As a result, the BS may be unable to determine onto which of the plurality of PUSCHs the UCI is multiplexed, which may prevent the BS from being able to decode the payload data of each PUSCH.

Some aspects described herein provide for uplink channel collision resolution for conditional MAC layer based prioritization. For example, a UE may determine an effect to a UCI multiplexing configuration of applying MAC priorities to a plurality of PUSCHs. If the UE determines that applying the MAC priorities results in an ambiguity in resolving which PUSCH includes UCI, the UE may determine not to apply the MAC priorities. In contrast, if the UE determines that using the MAC priorities does not result in ambiguity, the UE may determine to apply the MAC priorities. After determining whether to apply the MAC priorities, the UE may selectively transmit one or more PUSCHs with UCI. For example, in some cases the UE may transmit the one or more PUSCHs and may multiplex the UCI onto one of the one or more PUSCHs. In other cases, the UE may drop the one or more PUSCHs (i.e., the UE may not transmit the one or more PUSCHs) and may transmit a PUCCH to convey the UCI. In this way, the UE reduces a decoding processing complexity for the BS while enabling MAC layer prioritization to be used in some cases.

Figure 3A:
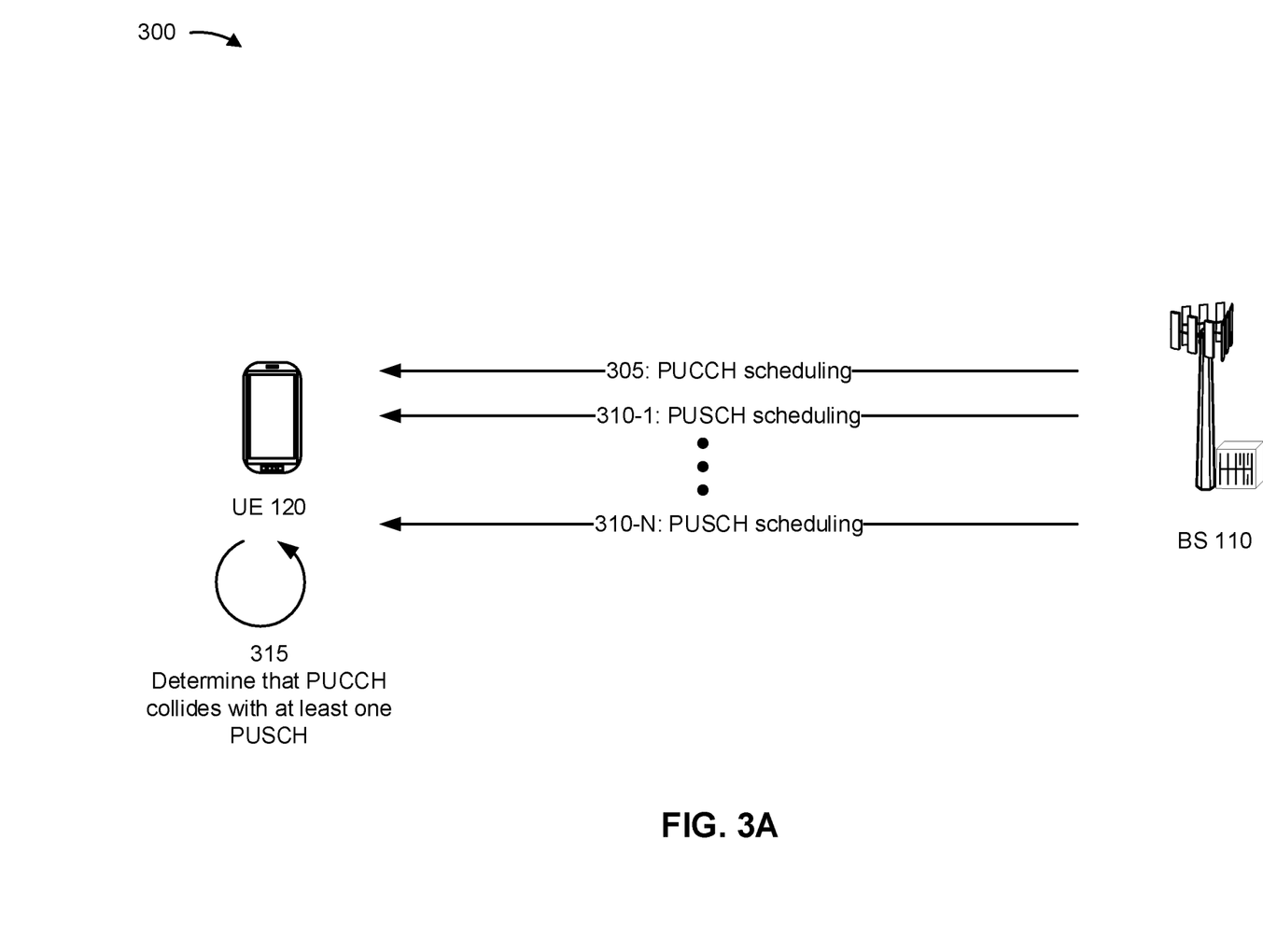
FIGS. 3A and 3B are diagrams illustrating an example of uplink channel collision resolution for conditional MAC layer based prioritization, in accordance with various aspects of the present disclosure.
Figure 3B:
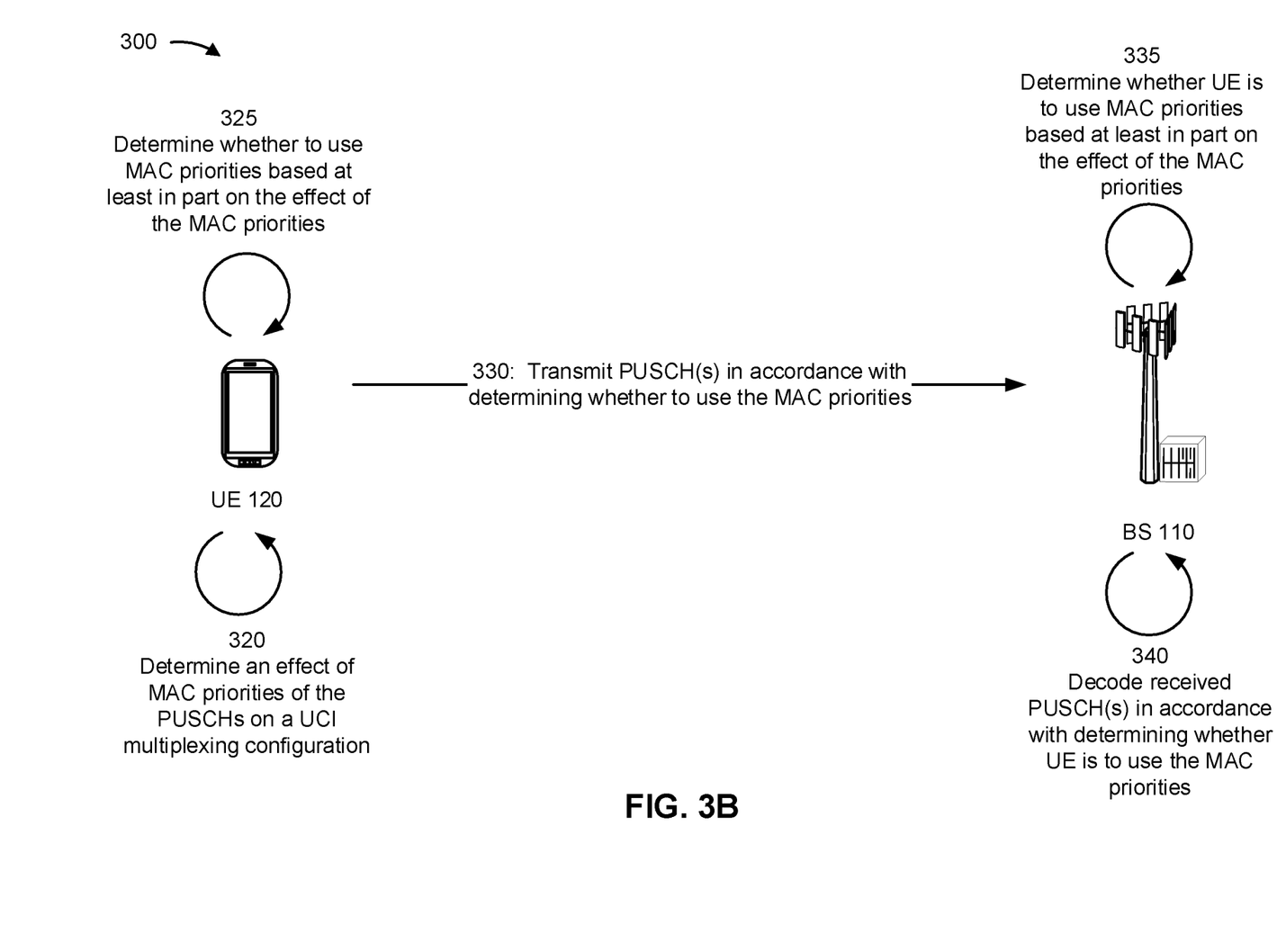

FIGS. 3A and 3B are diagrams illustrating an example 300 of uplink channel collision resolution for conditional MAC layer based prioritization. As shown in FIGS. 3A and 3B, example 300 includes a BS 110 and a UE 120.

As shown in FIG. 3A, and by reference numbers 305 and 310-1 through 310-N, UE 120 may receive scheduling information for transmitting an uplink channel. For example, BS 110 may provide, and UE 120 may receive, PUCCH scheduling information identifying a set of resources for transmitting a PUCCH with UCI. Additionally, or alternatively, BS 110 may provide, and UE 120 may receive, PUSCH scheduling information identifying a set of resources for transmitting a set of PUSCHs.

In some aspects, UE 120 may request the set of resources for transmitting an uplink channel. For example, UE 120 may transmit a scheduling request to request that BS 110 provide the PUSCH scheduling information to identify the set of resources. In some aspects, the uplink channels may be associated with a set of PHY priorities. For example, the scheduling information may include a set of DCIs identifying the set of PHY priorities of the set of PUSCHs. In this case, the set of DCIs may include explicit information (e.g., information explicitly indicating the set of PHY priorities) or implicit information (e.g., information identifying types of channels of the set of uplink channels from which UE 120 may implicitly derive the set of PHY priorities).

As further shown in FIG. 3A, and by reference number 315, UE 120 may determine that the PUCCH collides with at least one PUSCH. For example, UE 120 may determine that the PUCCH is scheduled for a same OFDM symbol as a PUSCH. In some aspects, UE 120 may determine that a plurality of PUSCHs of the set of PUSCHs are scheduled for a common time. For example, UE 120 may determine that the plurality of PUSCHs are scheduled for transmission using different component carriers at a common time.

As shown in FIG. 3B, and by reference numbers 320 and 325, UE 120 may determine an effect of MAC priorities of the PUSCHs on a UCI multiplexing configuration and may determine whether to apply the MAC priorities to the PUSCHs. For example, UE 120 may determine whether applying the MAC priorities to the PUSCHs results in a change to a PUSCH onto which a UCI is to be multiplexed relative to a set of PHY priority-based rules for multiplexing the UCI. In this case, UE 120 may determine whether applying the MAC priorities results in ambiguity for BS 110 in resolving which PUSCH includes the UCI, and may avoid the ambiguity by selecting to not apply the MAC priorities in such a case. Alternatively, UE 120 may apply the MAC priorities when an ambiguity is not a result of applying the MAC priorities.

In some aspects, UE 120 may determine that the MAC priorities do not alter which PUSCH is to include the UCI. For example, UE 120 may determine that, when using the MAC priorities, the UCI is to be multiplexed onto a same particular PUSCH as when using PHY priorities. In this case, UE 120 may select to use the MAC priorities (e.g., for the particular PUSCH and/or for assigning payload data to other PUSCHs). In some aspects, UE 120 may determine not to drop the particular PUSCH (e.g., in connection with the MAC priorities) when the particular PUSCH is selected for UCI multiplexing using the UCI multiplexing configuration and/or PHY priorities. For example, when there is not enough payload data for each of a plurality of PUSCHs, using MAC priorities may indicate that UE 120 is to drop a particular PUSCH. In this case, when the particular PUSCH is a PUSCH onto which UCI is to be multiplexed, UE 120 may determine not to drop the particular PUSCH. In this case, UE 120 may alter a distribution of data onto the plurality of PUSCHs and/or may drop one or more other PUSCHs of the plurality of PUSCHs. Similarly, when UE 120 determines (e.g., based at least in part on MAC priorities) that a first subset of PUSCHs are for transmitting high-priority data and a second subset of PUSCHs are for transmitting low-priority data and the UCI is to be multiplexed onto a particular PUSCH for transmitting low-priority data that is to be dropped, UE 120 may avoid dropping the particular PUSCH by selecting not to use MAC priorities.

In some aspects, UE 120 may determine that using the MAC priorities results in one or more candidate UCI multiplexing configurations that are based at least in part on which BS 110 may determine an actual UCI multiplexing configuration. For example, UE 120 may determine that using the MAC priorities results in less than or equal to a threshold quantity of candidate UCI multiplexing configurations (e.g., less than or equal to two candidate UCI multiplexing configurations). In this case, UE 120 may determine to use the MAC priorities, thereby enabling use of MAC priorities without creating excessive processing complexity for BS 110. In some aspects, UE 120 may select from a plurality of different UCI multiplexing configurations. For example, UE 120 may select from two candidate UCI multiplexing configurations (e.g., to multiplex UCI in accordance with a PHY layer rule or to transmit the UCI on a PUCCH). In this case, UE 120 may select a MAC layer data assignment configuration (e.g., in accordance with MAC priorities) that is consistent with the selected UCI multiplexing configuration. As a result, UE 120 ensures that application of MAC priorities satisfies a selected UCI multiplexing scheme, which may enable BS 110 to receive the UCI in accordance with the UCI multiplexing scheme. When UE 120 multiplexes the UCI with a PUSCH based at least in part on a PHY layer rule, a MAC layer of UE 120 may not drop the PUSCH. In this case, the MAC layer of UE 120 may cause the PHY layer of UE 120 to transmit a zero transport block (e.g., a set of padding bits) to maintain a PHY structure of the PUSCH.

In some aspects, UE 120 may determine that using the MAC priorities changes a UCI multiplexing configuration relative to using the PHY priorities, but may nevertheless determine to use the MAC priorities. For example, when UE 120 determines that the MAC priorities result in dropping a PUSCH onto which the UCI is to be multiplexed (e.g., in connection with the PHY priorities), UE 120 may determine to drop the PUSCH and include the UCI in the PUCCH. In this case, UE 120 may transmit the PUCCH and may forgo transmitting any PUSCH that collides with the PUCCH. In this case, BS 110 may attempt to detect whether UCI is multiplexed onto a PUSCH in accordance with a PHY layer rule and without MAC priorities (e.g., which may be applied consistent with the PHY layer rule). If not, BS 110 may determine that the UCI is transmitted on a PUCCH. Additionally, or alternatively, UE 120 may transfer the UCI from the PUSCH that is to be dropped to another PUSCH with a next lowest index (e.g., of a component carrier on which the other PUSCH is to be transmitted). In this case, UE 120 may forgo transmitting the PUCCH, but may transmit the other PUSCH to convey the UCI.

As further shown in FIG. 3B, and by reference number 330, UE 120 may selectively transmit (e.g., transmit in some circumstances and not transmit in other circumstances) one or more PUSCHs in accordance with determining whether to use the MAC priorities. For example, UE 120 may transmit a PUSCH that includes UCI multiplexed into the PUSCH. In some aspects, UE 120 may transmit a plurality of PUSCHs. For example, UE 120 may transmit a first PUSCH that includes UCI multiplexed into the PUSCH on a first component carrier, a second PUSCH on a second component carrier, and/or the like.

In some aspects, UE 120 may drop a PUSCH. For example, based at least in part on a MAC priority and based at least in part on determining to apply the MAC priority, UE 120 may drop a PUSCH that is scheduled for transmission. Additionally, or alternatively, UE 120 may select not to transmit any PUSCH. For example, when UE 120 determines to drop a PUSCH onto which a UCI is to be multiplexed based at least in part on the MAC priority, UE 120 may transfer the UCI onto a PUCCH, and may transmit the PUCCH rather than the PUSCH. In this case, UE 120 may forgo transmitting any PUSCHs concurrently with the PUCCH.

In some aspects, UE 120 may determine data to convey via one or more PUSCHs when transmitting the one or more PUSCHs. For example, UE 120 may multiplex UCI onto a first PUSCH based at least in part on a PHY priority and may use the MAC priorities to determine what data to assign to each of a set of second PUSCHs. In this way, UE 120 may avoid ambiguity in BS 110 resolving which PUSCH includes the UCI (e.g., BS 110 may determine which PUSCH includes the UCI based at least in part on the PHY priority) and may use the MAC priority to assign data, thereby improving network utilization. In some aspects, UE 120 may include one or more padding bits in a PUSCH transmission. For example, when UE 120 lacks data to include in a particular PUSCH onto which UCI is to be multiplexed, UE 120 may generate all-zero transport blocks as padding bits to be conveyed via the particular PUSCH to maintain a PHY layer structure of the particular PUSCH and avoid dropping the particular PUSCH.

As further shown in FIG. 3B, and by reference numbers 335 and 340, BS 110 may determine whether UE 120 is to use the MAC priorities based at least in part on the effect of the MAC priorities on the UCI multiplexing configuration and may receive the UCI. For example, BS 110 may determine that UE 120 dropped a PUSCH onto which UCI was to be multiplexed (e.g., based at least in part on a MAC priority) and may determine to receive a PUCCH onto which UE 120 transferred the UCI.

Additionally, or alternatively, BS 110 may determine that UE 120 dropped a PUSCH onto which UCI was to be multiplexed and may determine that a next lowest indexed PUSCH includes the UCI. In this case, BS 110 may decode the next lowest indexed PUSCH to receive the UCI and may decode one or more other PUSCHs that do not include UCI. Additionally, or alternatively, BS 110 may determine that UCI is to be multiplexed onto a particular PUSCH based at least in part on PHY priorities, and may determine that UE 120 is not applying a MAC priority to the particular PUSCH (and that UE 120 is applying MAC priorities to other PUSCHs, as described above). In this case, BS 110 may receive the particular PUSCH with the UCI and one or more other PUSCHs without UCI.

As indicated above, FIGS. 3A and 3B are provided as examples. Other examples may differ from what is described with respect to FIGS. 3A and 3B.

Figure 4:
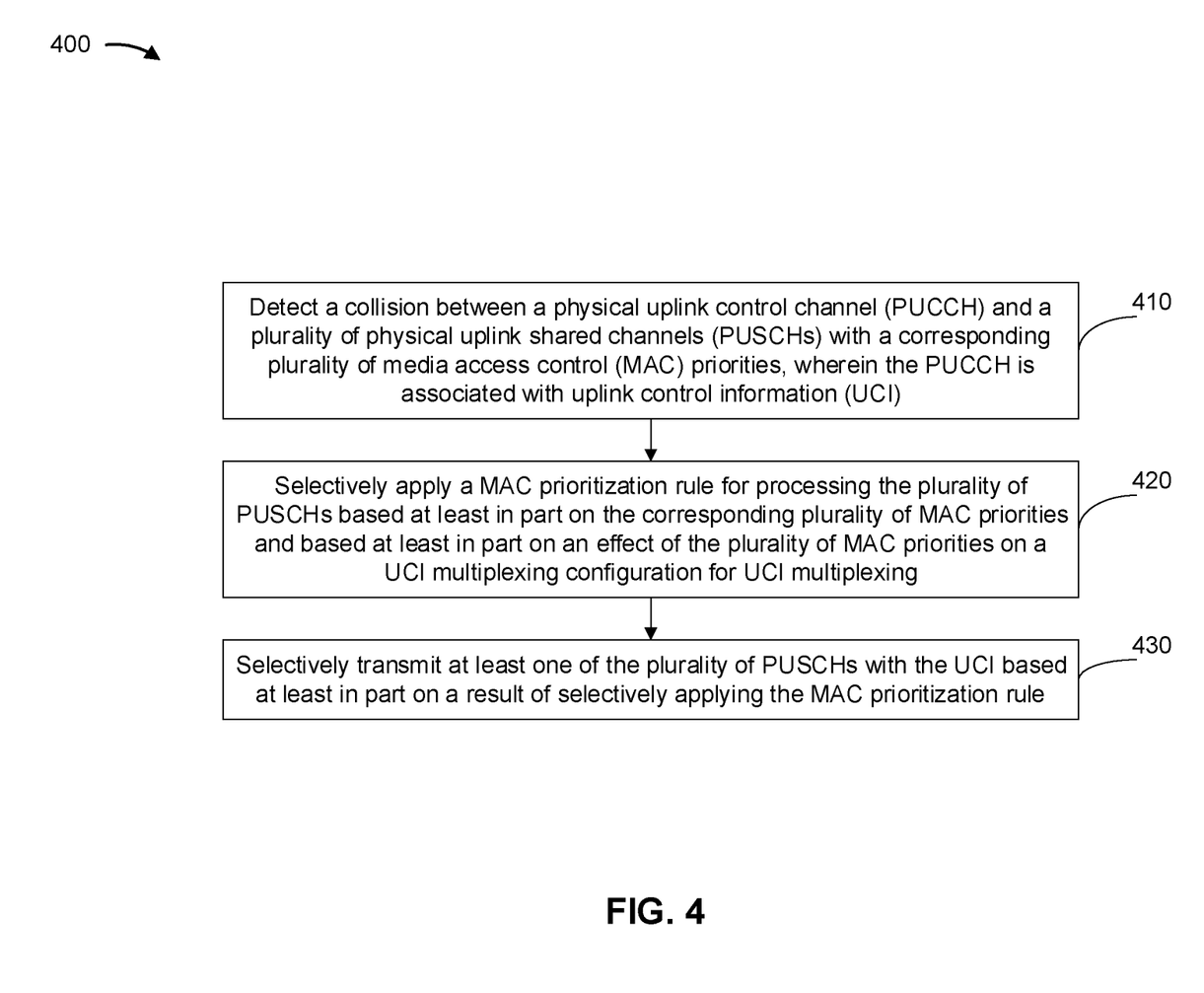
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with uplink channel collision resolution for conditional MAC layer based prioritization.

As shown in FIG. 4, in some aspects, process 400 may include detecting a collision between a PUCCH and a plurality of PUSCHs with a corresponding plurality of MAC priorities wherein the PUCCH is associated with UCI (block 410). For example, the UE (e.g., using receive processor 258, transmit processor 264, controller/processor 280, memory 282, and/or the like) may detect a collision between a PUCCH and a plurality of PUSCHs with a corresponding plurality of MAC priorities and wherein the PUCCH is associated with UCI, as described above, for example, with reference to FIGS. 3A and 3B. In some aspects, the PUCCH is associated with UCI.

As further shown in FIG. 4, in some aspects, process 400 may include selectively applying a MAC prioritization rule for processing the plurality of PUSCHs based at least in part on the corresponding plurality of MAC priorities and based at least in part on an effect of the plurality of MAC priorities on a UCI multiplexing configuration for UCI multiplexing (block 420). For example, the UE (e.g., using receive processor 258, transmit processor 264, controller/processor 280, memory 282, and/or the like) may selectively apply a MAC prioritization rule for processing the plurality of PUSCHs based at least in part on the corresponding plurality of MAC priorities and based at least in part on an effect of the plurality of MAC priorities on a UCI multiplexing configuration for UCI multiplexing, as described above, for example, with reference to FIGS. 3A and 3B.

As further shown in FIG. 4, in some aspects, process 400 may include selectively transmitting at least one of the plurality of PUSCHs with the UCI based at least in part on a result of selectively applying the MAC prioritization rule (block 430). For example, the UE (e.g., using receive processor 258, transmit processor 264, controller/processor 280, memory 282, and/or the like) may selectively transmit at least one of the plurality of PUSCHs with the UCI based at least in part on a result of selectively applying the MAC prioritization rule, as described above, for example, with reference to FIGS. 3A and 3B.

Process 400 may include additional aspects, such as any single aspect or any combination of aspects described below and/or in connection with one or more other processes described elsewhere herein.

In a first aspect, the plurality of PUSCHs are scheduled on a corresponding plurality of different uplink component carriers.

In a second aspect, alone or in combination with the first aspect, selectively applying the MAC prioritization rule for processing the plurality of PUSCHs includes determining to use the corresponding plurality of MAC priorities for processing the plurality of PUSCHs based at least in part on the plurality of MAC priorities not altering a PHY layer rule for the UCI multiplexing configuration.

In a third aspect, alone or in combination with one or more of the first and second aspects, selectively applying the MAC prioritization rule for processing the plurality of PUSCHs includes multiplexing the UCI to a first PUSCH, of the plurality of PUSCHs, based at least in part on the UCI multiplexing configuration; and using the corresponding plurality of MAC priorities for assignment of data to one or more second PUSCHs, of the plurality of PUSCHs, onto which the UCI is not multiplexed.

In a fourth aspect, alone or in combination with one or more of the first through third aspects, process 400 may include applying a PHY layer priority to data assignment for a particular PUSCH onto which the UCI is multiplexed.

In a fifth aspect, alone or in combination with one or more of the first through fourth aspects, selectively applying the MAC prioritization rule for processing the plurality of PUSCHs includes multiplexing the UCI to a particular PUSCH, of the plurality of PUSCHs, based at least in part on the UCI multiplexing configuration; and determining not to drop the particular PUSCH in accordance with the corresponding plurality of MAC priorities.

In a sixth aspect, alone or in combination with one or more of the first through fifth aspects, process 400 may include adding one or more padding bits to the particular PUSCH in order to maintain a PHY layer structure of the particular PUSCH.

In a seventh aspect, alone or in combination with one or more of the first through sixth aspects, selectively applying the MAC prioritization rule for processing the plurality of PUSCHs includes processing the plurality of PUSCHs in accordance with the corresponding plurality of MAC priorities based at least in part on the UCI multiplexing being associated with less than or equal to a threshold quantity of UCI multiplexing options.

In an eighth aspect, alone or in combination with one or more of the first through seventh aspects, selectively applying the MAC prioritization rule for processing the plurality of PUSCHs includes processing the plurality of PUSCHs in accordance with the corresponding plurality of MAC priorities based at least in part on the UCI multiplexing being associated with less than or equal to two UCI multiplexing options.

In a ninth aspect, alone or in combination with one or more of the first through eighth aspects, selectively applying the MAC prioritization rule for processing the plurality of PUSCHs includes determining that the corresponding plurality of MAC priorities alters the UCI multiplexing configuration; and processing the plurality of PUSCHs without using the corresponding plurality of MAC priorities based at least in part on determining that the corresponding plurality of MAC priorities alters the UCI multiplexing configuration.

In a tenth aspect, alone or in combination with one or more of the first through ninth aspects, selectively applying the MAC prioritization rule for processing the plurality of PUSCHs includes dropping, based at least in part on the corresponding plurality of MAC priorities, a particular PUSCH, of the plurality of PUSCHs, onto which the UCI is to be multiplexed; transferring the UCI to the PUCCH based at least in part on dropping the particular PUSCH; and processing the plurality of PUSCHs in accordance with the corresponding plurality of MAC priorities based at least in part on determining to drop the particular PUSCH and transferring the UCI to the PUCCH.

In an eleventh aspect, alone or in combination with one or more of the first through tenth aspects, process 400 may include transmitting the PUCCH based at least in part on transferring the UCI to the PUCCH; and dropping the plurality of PUSCHs based at least in part on transferring the UCI to the PUCCH.

In a twelfth aspect, alone or in combination with one or more of the first through eleventh aspects, selectively applying the MAC prioritization rule for processing the plurality of PUSCHs includes dropping, based at least in part on the corresponding plurality of MAC priorities, a particular PUSCH onto which the UCI is to be multiplexed; moving, based at least in part on dropping the particular PUSCH, the UCI to a next lowest indexed PUSCH after the particular PUSCH; and processing the plurality of PUSCHs in accordance with the corresponding plurality of MAC priorities based at least in part on determining to drop the particular PUSCH and moving the UCI to the next lowest indexed PUSCH.

In a thirteenth aspect, alone or in combination with one or more of the first through twelfth aspects, an index of the next lowest indexed PUSCH is a component carrier index for a component carrier for which the next lowest indexed PUSCH is scheduled.

In a fourteenth aspect, alone or in combination with one or more of the first through thirteenth aspects, process 400 may include dropping the plurality of PUSCHs based at least in part on a PHY layer priority rule.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
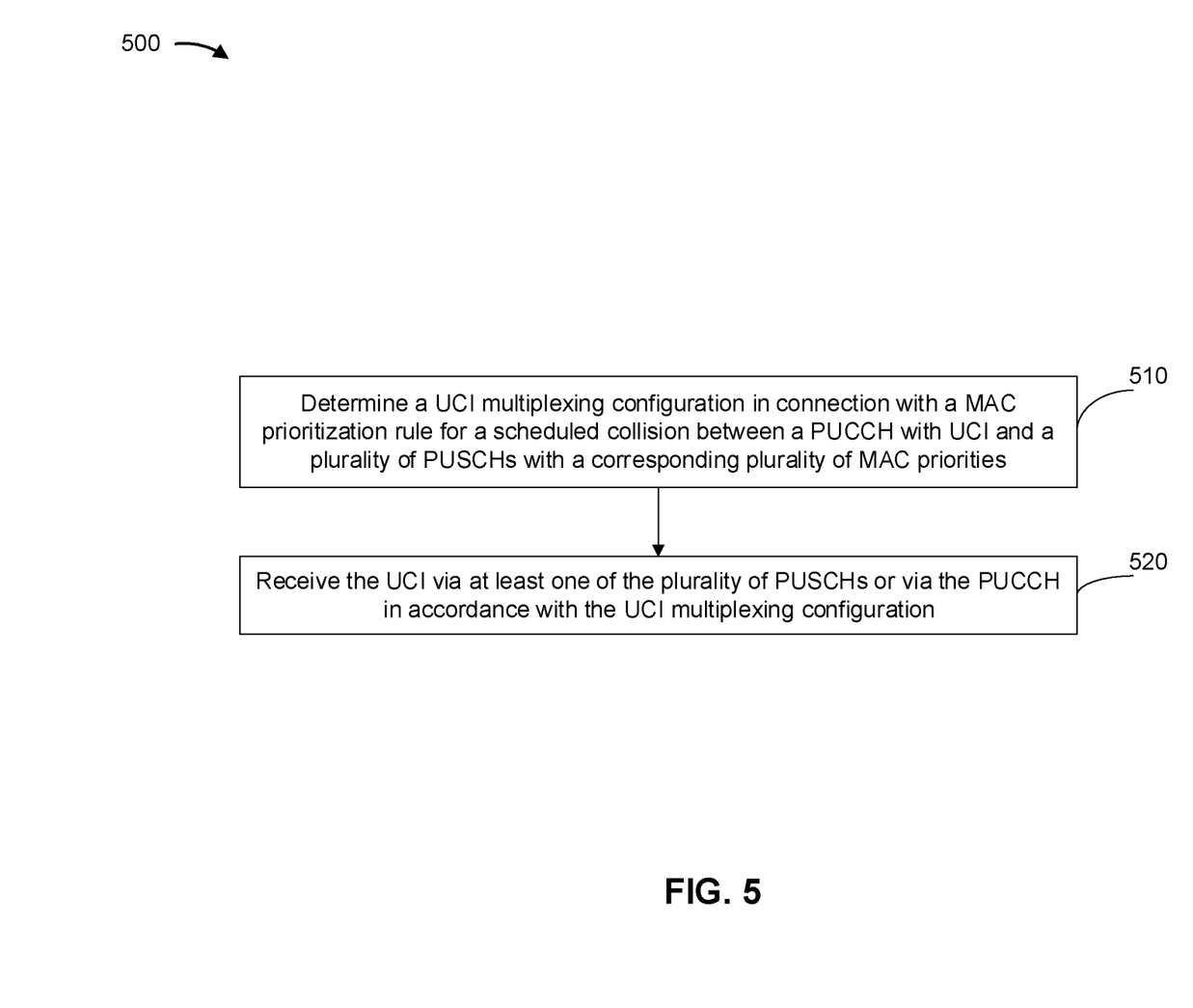
FIG. 5 is a diagram illustrating an example process performed, for example, by a user equipment, in accordance with various aspects of the present disclosure.

FIG. 5 is a diagram illustrating an example process 500 performed, for example, by a BS, in accordance with various aspects of the present disclosure. Example process 500 is an example where a BS (e.g., BS 110 and/or the like) performs operations associated with uplink channel collision resolution for conditional MAC layer based prioritization.

As shown in FIG. 5, in some aspects, process 500 may include determining a UCI multiplexing configuration in connection with a MAC prioritization rule for a scheduled collision between a PUCCH with UCI and a plurality of PUSCHs with a corresponding plurality of MAC priorities (block 510). For example, the BS (e.g., using transmit processor 220, receive processor 238, controller/processor 240, memory 242, and/or the like) may determine a UCI multiplexing configuration in connection with a MAC prioritization rule for a scheduled collision between a PUCCH with UCI and a plurality of PUSCHs with a corresponding plurality of MAC priorities, as described above, for example, with reference to FIGS. 3A and 3B.

As further shown in FIG. 5, in some aspects, process 500 may include receiving the UCI via at least one of the plurality of PUSCHs or via the PUCCH in accordance with the UCI multiplexing configuration (block 520). For example, the BS (e.g., using transmit processor 220, receive processor 238, controller/processor 240, memory 242, and/or the like) may receive at least one of the plurality of PUSCHs based at least in part on determining the UCI multiplexing configuration, as described above, for example, with reference to FIGS. 3A and 3B.

Process 500 may include additional aspects, such as any single aspect or any combination of aspects described below and/or in connection with one or more other processes described elsewhere herein.

In a first aspect, determining the UCI multiplexing configuration includes deterministically resolving a UCI multiplexing configuration. For example, the BS may resolve the UCI multiplexing configuration based at least in part on a set of rules for selecting which uplink channel to use for the UCI.

In a second aspect, alone or in combination with the first aspect, determining the UCI multiplexing configuration includes processing the plurality of PUSCHs in accordance with a plurality of candidate UCI multiplexing configurations.

In a third aspect, alone or in combination with any one or more of the first and second aspects, process 500 may include determining the UCI multiplexing configuration based at least in part on a PHY layer priority rule.

In a fourth aspect, alone or in combination with any one or more of the first through third aspects, process 500 may include determining that the UCI is multiplexed to a particular PUSCH of the plurality of PUSCHs, wherein the particular PUSCH is not dropped based at least in part on the UCI being multiplexed to the particular PUSCH; and demultiplexing the UCI from the particular PUSCH.

In a fifth aspect, alone or in combination with any one or more of the first through fourth aspects, the particular PUSCH includes one or more padding bits in order to maintain a PHY layer structure of the at least one PUSCH.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting a collision between a physical uplink control channel (PUCCH) and a plurality of physical uplink shared channels (PUSCHs) with a corresponding plurality of media access control (MAC) priorities,
      wherein the PUCCH is associated with uplink control information (UCI);
   selectively applying a MAC prioritization rule for processing the plurality of PUSCHs based at least in part on the corresponding plurality of MAC priorities and based at least in part on an effect of the plurality of MAC priorities on a UCI multiplexing configuration for UCI multiplexing,
      wherein the plurality of PUSCHs include a particular PUSCH onto which the UCI is multiplexed, and
      wherein the particular PUSCH includes one or more padding bits in order to maintain a physical (PHY) layer structure of the particular PUSCH; and
   selectively transmitting at least one of the plurality of PUSCHs with the UCI based at least in part on a result of selectively applying the MAC prioritization rule.

2. The method of claim 1, wherein the plurality of PUSCHs are scheduled on a corresponding plurality of different uplink component carriers.

3. The method of claim 1, wherein selectively applying the MAC prioritization rule for processing the plurality of PUSCHs comprises:
   determining to use the corresponding plurality of MAC priorities for processing the plurality of PUSCHs based at least in part on the plurality of MAC priorities not altering a PHY layer rule for the UCI multiplexing configuration.

4. The method of claim 1, wherein selectively applying the MAC prioritization rule for processing the plurality of PUSCHs comprises:
   multiplexing the UCI to a first PUSCH, of the plurality of PUSCHs, based at least in part on the UCI multiplexing configuration, wherein the first PUSCH is the particular PUSCH; and
   using the corresponding plurality of MAC priorities for assignment of data to one or more second PUSCHs, of the plurality of PUSCHs, onto which the UCI is not multiplexed.

5. The method of claim 1, further comprising:
   applying a PHY layer priority to data assignment for the particular PUSCH.

6. The method of claim 1, wherein selectively applying the MAC prioritization rule for processing the plurality of PUSCHs comprises:
   multiplexing the UCI onto the particular PUSCH, based at least in part on the UCI multiplexing configuration; and
   determining not to drop the particular PUSCH based at least in part on the UCI being multiplexed onto the particular PUSCH.

7. The method of claim 1, wherein selectively applying the MAC prioritization rule for processing the plurality of PUSCHs comprises:
   processing the plurality of PUSCHs in accordance with the corresponding plurality of MAC priorities based at least in part on the UCI multiplexing being associated with less than or equal to a threshold quantity of UCI multiplexing options.

8. The method of claim 1, wherein selectively applying the MAC prioritization rule for processing the plurality of PUSCHs comprises:
   processing the plurality of PUSCHs in accordance with the corresponding plurality of MAC priorities based at least in part on the UCI multiplexing being associated with less than or equal to two UCI multiplexing options.

9. The method of claim 1, wherein selectively applying the MAC prioritization rule for processing the plurality of PUSCHs comprises:
   determining that the corresponding plurality of MAC priorities alters the UCI multiplexing configuration; and
   processing the plurality of PUSCHs without using the corresponding plurality of MAC priorities based at least in part on determining that the corresponding plurality of MAC priorities alters the UCI multiplexing configuration.

10. The method of claim 1, wherein maintaining the PHY layer structure comprises a determination not to drop the particular PUSCH based at least in part on UCI being multiplexed onto the particular PUSCH.

11. The method of claim 1, wherein selectively transmitting at least one of the plurality of PUSCHs comprises:
   transmitting the particular PUSCH based at least in part on the UCI being multiplexed onto the particular PUSCH.

12. A method of wireless communication performed by a network entity, comprising:
   determining an uplink control information (UCI) multiplexing configuration in connection with a media access control (MAC) prioritization rule for a scheduled collision between a physical uplink control channel (PUCCH) with UCI and a plurality of physical uplink shared channels (PUSCHs) with a corresponding plurality of MAC priorities,
      wherein the plurality of PUSCHs include a particular PUSCH onto which the UCI is multiplexed, and
      wherein the particular PUSCH includes one or more padding bits in order to maintain a physical (PHY) layer structure of the particular PUSCH; and receiving the UCI via at least one of the plurality of PUSCHs or via the PUCCH in accordance with the UCI multiplexing configuration.

13. The method of claim 12, wherein determining the UCI multiplexing configuration comprises:
deterministically resolving a UCI multiplexing configuration.

14. The method of claim 12, wherein determining the UCI multiplexing configuration comprises:
processing the plurality of PUSCHs in accordance with a plurality of candidate UCI multiplexing configurations.

15. The method of claim 12, wherein determining the UCI multiplexing configuration comprises:
determining the UCI multiplexing configuration based at least in part on a PHY layer priority rule.

16. The method of claim 12, wherein receiving the UCI comprises:
determining that the UCI is multiplexed to the particular PUSCH, wherein the particular PUSCH is not dropped based at least in part on the UCI being multiplexed onto the particular PUSCH; and
demultiplexing the UCI from the particular PUSCH based on determining that that the UCI is multiplexed to the particular PUSCH.

17. The method of claim 12, wherein maintaining the PHY layer structure comprises a determination not to drop the particular PUSCH based at least in part on UCI being multiplexed onto the particular PUSCH.

18. A user equipment (UE) for wireless communication, comprising:
a memory; and
one or more processors operatively coupled to the memory, the one or more processors configured to:
detect a collision between a physical uplink control channel (PUCCH) and a plurality of physical uplink shared channels (PUSCHs) with a corresponding plurality of media access control (MAC) priorities, wherein the PUCCH is associated with uplink control information (UCI);
selectively apply a MAC prioritization rule for processing the plurality of PUSCHs based at least in part on the corresponding plurality of MAC priorities and based at least in part on an effect of the plurality of MAC priorities on a UCI multiplexing configuration for UCI multiplexing,
wherein the plurality of PUSCHs include a particular PUSCH onto which the UCI is multiplexed, and
wherein the particular PUSCH includes one or more padding bits in order to maintain a physical (PHY) layer structure of the particular PUSCH; and
selectively transmit at least one of the plurality of PUSCHs with the UCI based at least in part on a result of selectively applying the MAC prioritization rule.

19. The UE of claim 18, wherein the plurality of PUSCHs are scheduled on a corresponding plurality of different uplink component carriers.

20. The UE of claim 18, wherein the one or more processors, when selectively applying the MAC prioritization rule for processing the plurality of PUSCHs, are configured to:
determine to use the corresponding plurality of MAC priorities for processing the plurality of PUSCHs based at least in part on the plurality of MAC priorities not altering a PHY layer rule for the UCI multiplexing configuration.

21. The UE of claim 18, wherein the one or more processors, when selectively applying the MAC prioritization rule for processing the plurality of PUSCHs, are configured to:
multiplex the UCI to a first PUSCH, of the plurality of PUSCHs, based at least in part on a physical (PHY) layer priority rule, wherein the first PUSCH is the particular PUSCH; and
use the corresponding plurality of MAC priorities for assignment of data to one or more second PUSCHs, of the plurality of PUSCHs, onto which the UCI is not multiplexed.

22. The UE of claim 18, wherein the one or more processors are further configured to:
apply a PHY layer priority to data assignment for the particular PUSCH.

23. The UE of claim 18, wherein maintaining the PHY layer structure comprises a determination not to drop the particular PUSCH based at least in part on UCI being multiplexed onto the particular PUSCH.

24. The UE of claim 18, wherein the one or more processors, when selectively transmitting at least one of the plurality of PUSCHs, are configured to:
transmit the particular PUSCH based at least in part on the UCI being multiplexed onto the particular PUSCH.

25. A network entity for wireless communication, comprising:
a memory; and
one or more processors operatively coupled to the memory, the one or more processors configured to:
determine an uplink control information (UCI) multiplexing configuration in connection with a media access control (MAC) prioritization rule for a scheduled collision between a physical uplink control channel (PUCCH) with UCI and a plurality of physical uplink shared channels (PUSCHs) with a corresponding plurality of MAC priorities,
wherein the plurality of PUSCHs include a particular PUSCH onto which the UCI is multiplexed, and
wherein the particular PUSCH includes one or more padding bits in order to maintain a physical (PHY) layer structure of the particular PUSCH; and
receive the UCI via at least one of the plurality of PUSCHs or via the PUCCH in accordance with the UCI multiplexing configuration.

26. The network entity of claim 25, wherein the one or more processors, when determining the UCI multiplexing configuration, are configured to:
deterministically resolve a UCI multiplexing configuration.

27. The network entity of claim 25, wherein the one or more processors, when determining the UCI multiplexing configuration, are configured to:
process the plurality of PUSCHs in accordance with a plurality of candidate UCI multiplexing configurations.

28. The network entity of claim 25, wherein the one or more processors, when determining the UCI multiplexing configuration, are configured to:
determine the UCI multiplexing configuration based at least in part on a PHY layer priority rule.

29. The network entity of claim 25, wherein the one or more processors, when receiving the UCI, are configured to:
determine that the UCI is multiplexed to the particular PUSCH, wherein the particular PUSCH is not dropped based at least in part on the UCI being multiplexed onto the particular PUSCH; and demultiplex the UCI from the particular PUSCH based on determining that that the UCI is multiplexed to the particular PUSCH.

30. The network entity of claim 25, wherein maintaining the PHY layer structure comprises a determination not to drop the particular PUSCH based at least in part on UCI being multiplexed onto the particular PUSCH.

\* \* \* \* \*